Patented May 3, 1938

2,116,063

UNITED STATES PATENT OFFICE 2,116,063

TREATMENT OF ARTIFICIAL MATERIALS

Henry Dreyfus, London, England

No Drawing. Application February 1, 1934, Serial No. 709,336. In Great Britain February 14, 1933

10 Claims. (Cl. 8—20)

This invention relates to the treatment of materials and more particularly to processes for the saponification of cellulose ester materials.

The saponification of yarns and other materials containing cellulose acetate by means of caustic soda or caustic potash has been known for many years, and was first proposed with the object of conferring upon the fibre an affinity for cotton dyes before the method of applying dispersed insoluble dyestuffs removed the difficulties inherent in the dyeing of cellulose acetate. Later, saponification methods were again resorted to not with the main object of conferring these different dyeing properties upon the cellulose acetate, but rather with the object of increasing the safe ironing point of the materials. The processes generally involve a treatment of the material with aqueous caustic alkali, though in Canadian Patent No. 313,336 and U. S. Patent No. 1,962,139, processes are described in which the caustic soda or caustic potash is applied in a medium of methyl or ethyl alcohol, glycol, glycerol, or other mono-, di- or poly-hydric alcohol, so that the amount of caustic soda or caustic potash necessary to effect a given amount of saponification is only a fraction of that theoretically equivalent to the acetyl groups eliminated from the material.

It will readily be appreciated that it is essential in saponifying cellulose acetate or other cellulose ester materials to be able to ensure that, in the areas treated with the saponifying agent, saponification shall be substantially uniform. In order to obtain uniform saponification it is highly advantageous, as described in U. S. Patents Nos. 1,884,622 and 1,884,623, to apply the saponifying agent by methods of mechanical impregnation, the impregnated material being then carried over heated drums or other heated surfaces so that not only is the saponification rapid, but there can be little or no migration of saponifying agent from one point on the material to another point where saponification has started, an effect resulting in irregular saponification. Difficulty may, however, be experienced in applying the saponifying agent by the method of mechanical impregnation in sufficient quantity to produce a high degree of saponification and especially to produce complete or substantially complete saponification.

According to the present invention compounds which increase the ability of materials to retain a given weight of a compound or composition applied to it are applied to the material containing a cellulose ester before the application of a saponifying composition and/or are incorporated in saponifying compositions for the saponification of cellulose ester materials.

Thus, it has been found that by increasing the viscosity of a saponifying composition, material containing a cellulose ester can be caused to retain a greater amount of the saponifying agent. Again, the impregnation of the materials with hygroscopic bodies and/or the incorporation in the saponifying compositions of hygroscopic bodies permits the use of higher concentrations of reagents than would otherwise be possible, and the invention includes the application of such bodies to materials containing cellulose esters and/or the incorporation of such bodies in saponifying compositions for use in saponifying the materials. Thus for a given concentration of saponifying agent the invention enables a higher degree of saponification to be effected than would otherwise be possible, and enables less concentrated saponifying media to be used to achieve a given saponification.

Examples of compounds which may be applied to the materials prior to the application of the saponifying compositions or which may be incorporated in the saponifying compositions in accordance with the present invention are sodium acetate, sodium silicate, di- and poly-hydric alcohols, sodium salts of higher fatty acids, e. g. sodium oleate, sodium palmitate or sodium stearate. While these bodies may be employed in any desired proportions, it is preferable they should be applied to the materials in fairly large quantities, e. g. 10 to 20 or 30% or even more, or that the saponifying composition should contain fairly high proportions of one or more of these bodies. Again, water-soluble colloidal substances which are relatively stable to the saponifying agent, e. g. water-soluble cellulose ethers, especially methyl cellulose and oxyalkyl celluloses may be employed with advantage in the saponifying medium even in low concentration.

Where the agent increasing the ability of the material to retain a given weight of the saponifying composition is applied to the material before the saponifying composition, it is preferably applied immediately before the saponifying composition. The agent may be applied by any convenient method. Thus it may be applied by any of the methods subsequently described for the application of the saponifying composition.

Any convenient saponifying agent may be employed. It is preferred, however, to employ a saponifying agent having a high solubility in the liquid medium in which it is applied and a high degree of saponifying power relative to its weight. It has been found preferable to employ such saponifying agents as sodium or potassium hydroxide in the saponification of cellulose ester materials in accordance with the present invention, though the invention is in no way limited to the use of these saponifying agents.

The saponifying agent is preferably applied in an aqueous medium, but it may be applied in other media containing available hydroxyl, for example aqueous-alcoholic or alcoholic or other media, e. g. the alcoholic media described in U. S. Patent 2,053,766. For example, the saponifying composition may contain swelling agents, e. g. ethyl alcohol, diacetone alcohol, ethyl lactate and the like. It may further contain additional saponifying agents, such, for example, as calcium carbonate, lime, baryta, barium carbonate and the like, such, for example, as are described in U. S. Patent No. 2,049,430. It will be appreciated that the agent increasing the ability of the material to retain the saponifying agent may itself exercise saponifying properties.

If desired, the saponifying composition may contain oils and/or sulphonated oils and/or soaps, for example any of the oils and sulphonated oils and soaps of U. S. Patent 2,058,574. Where it is desired to colour the materials, dyestuffs having affinity for cotton may be incorporated in the saponifying composition. Discharge effects may also be obtained on cellulose acetate dyed with dischargeable colours by locally applying saponifying compositions containing discharging agents.

The saponifying medium may be applied in any convenient manner, for example by a bath treatment, or by padding, the materials preferably being afterwards dried on heated drums or in a dryer. Particularly good results are obtained by mechanically impregnating the materials with the saponifying composition, e. g. by padding the materials in a padding mangle, and then carrying the impregnated material over heated drums or other heated surfaces. The treatment may be an all-over treatment or a local treatment.

The invention is applicable to the saponification of saponifiable cellulose ester materials broadly. Thus, for example, it may be applied in the saponification of cellulose acetate materials or materials made of or containing cellulose formate, propionate, or butyrate. Special mention may be made of cellulose ester materials containing cellulose esters of high viscosity. Thus, while the process of the invention may be applied to the treatment of cellulose acetate or other saponifiable esters of cellulose of low, medium or high viscosity, for instance cellulose acetate having a viscosity of 5 to 10, 20 to 30, 50 to 100 or 200 or more as measured by comparing the viscosity of a 6% solution in acetone against a standard of glycerine taken as 100, the invention is especially valuable in the treatment of cellulose acetates having a viscosity amongst the higher figures mentioned.

The agent increasing the ability of the materials to retain a given weight of a reagent applied to them and the saponifying agent may be applied at any convenient stage. Thus, for example, they may be applied to filaments, yarns and the like continuously with their production, by wet or dry spinning methods, or to filaments, yarns and the like in hank form or while the filaments, yarns and the like are passing from bobbin to bobbin or during any other re-winding operation, or it may be applied to fabrics containing cellulose ester yarns. In treating filaments, yarns and the like considerable economy accrues by effecting saponification while the yarns and the like are in warp formation.

The invention is of outstanding value for the production of saponified cellulose ester yarn of high tenacity, and in order to obtain this, the saponifying agent is applied to cellulose ester materials which have been stretched during or subsequent to their manufacture. To obtain the highest tensile strength the yarn should not be stretched after saponification. Where yarn is treated it is indeed preferably wound either under no applied tension or under only comparatively light tension. When wound in this way contraction of the yarn or other material may take place during the operation and in consequence the saponified yarn or thread obtained has higher strength than if it is wound at the same rate as it is unwound from the delivery package or delivered by the spinning machine. As examples of methods of winding yarn with no tension or under comparatively light tension, may be cited the methods described in Canadian Patent No. 348,112.

The highest tensile strengths in the saponified yarn are obtainable if a stretched yarn of high viscosity cellulose acetate is saponified, e. g. a viscosity of 75 or more as indicated above.

As has been indicated, the stretching may take place at any convenient stage, but where high tensile strength is required, should not take place after saponification. The stretching may be carried out by any suitable process, as, for example, those specifically described in British Patent No. 323,790, or the stretching in stages described in British Patent No. 370,430. As described in British Patent No. 371,461, considerable economy and other advantages accrue from carrying out the stretching operation with the yarns, threads or the like in warp formation. Thus this method enables a number of yarns to be saponified under substantially identical conditions in respect of tension and other factors affecting the dyeing properties of the resulting materials—a feature which has been found to be of great importance in ensuring a uniform product from which high quality fabrics can be made.

The stretching may be facilitated by means of solvents or swelling agents for the cellulose acetate or other cellulose esters, for example aqueous solutions of thiocyanates, such as those of the alkalies, ammonium and alkaline earths, aqueous solutions of zinc chloride, acetic acid, formic acid, lactic acid, diacetone alcohol, acetone and the like; the ethers, esters or etheresters of olefine glycols and poly-olefine glycols, for instance the mono- and di-methyl and ethyl ethers of ethylene glycol, the monomethyl and ethyl ethers of propylene glycol, and the monoethyl ether of diethylene glycol, dioxane and its homologues and substitution products; glycol monoacetate, methyl glycol monoacetate, mono-, di- and tri-acetins, etc.; phenols, formaldehyde, acetaldehyde, dichlorethylene, methylene chloride and the like, or mixtures of these, or solvent mixtures. Such processes of stretching may be applied either to wet or to dry spun yarns. Instead of or in addition to stretching the yarn after its formation either continuously or discontinuously with production, the yarn to be treated in accordance with the present invention may be stretched considerably during its formation. In dry spinning operations this involves a softening treatment during the dry spinning process so as to enable a substantial stretch to be applied to the materials, while in the case of wet spinning the nature of the coagulating bath or of the spinning solution may be such that a very considerable stretch may be imparted to the materials during their actual formation. Processes of this character are described in British Patents Nos. 340,324 and 340,325, Canadian Patent No. 321,722, British Patent No. 343,062 and U. S. Patent No. 2,086,122.

Again, the materials may be treated with a solvent or swelling agent dissolved in a non-solvent medium for the cellulose derivative and containing salts, sugars and other agents tending to decrease the solubility of the solvent in the non-solvent, and, stretched, or the materials carrying the solvent or swelling agent and a non-solvent may be treated with an agent tending to decrease the solubility of the solvent or swelling agent in the non-solvent, and stretched. For a description of processes of this character reference may be made to Canadian Patent No. 343,253 and U. S. Patent No. 2,075,027.

In general, the stretching of the threads either during, continuously with or after their formation may be such as to impart to the threads an initial tenacity exceeding 1.5 grams per denier and preferably exceeding 2 or even 2.5 or more grams per denier.

The extent of the saponification may vary considerably depending upon the object which it is desired to achieve. Thus, for example, the cellulose ester material may be saponified to an extent of 20, 25, 35, 50 or 75% or more, for example to attain complete saponification of the cellulose ester material, or to reach such a stage that the material resembles material obtained by the viscose process in dyeing and other chemical properties. On the other hand the degree of saponification may be considerably lower, e. g. 10–15% or even less. However, if desired, the saponification may be merely carried to the point where affinity both for cotton dyes and for dispersed insoluble colours still obtains, for example when there is a loss in weight of 50% or less of acetyl or even a loss in weight of only about 5%.

The following examples illustrate the invention:—

Example 1

A warp of yarns of cellulose acetate which have been stretched to 400% of their original length, is carried through a short aqueous bath containing 10% sodium hydroxide and 20% sodium acetate. The warp is carried directly from the bath to a series of hollow steam heated rolls, round which the materials pass and from which they emerge in a substantially dry condition. The saponification, or at least the major part of the saponification, is effected during the drying step.

Example 2

Material comprising cellulose acetate in the form of a fabric or of a warp or sheet of yarns is passed through a bath containing a 30% aqueous solution of sodium acetate and is then dried by passage over a series of steam heated hollow rolls. The dried material is taken directly through a short bath containing 5% sodium hydroxide to a further series of steam heated hollow rolls round which the material passes and from the last of which it emerges substantially dry. As in Example 1, at least the major part of the saponification is effected while the materials are passing round the further series of drying rolls.

Example 3

The process is carried out as in Example 2, except that the sodium hydroxide solution is applied by means of a padding mangle.

Example 4

The process is carried out as described in Example 1, except that the bath contains 5% of sodium hydroxide and 20% of sodium stearate.

Example 5

The process is carried out as in Example 1, except that the bath contains a 5% solution of water-soluble methyl cellulose.

While the invention has been described above more particularly in relation to the treatment of materials consisting wholly of cellulose acetate or other saponifiable ester of cellulose, it may equally be applied to the treatment of mixed yarns or other mixed materials containing such esters in association with other materials, as for instance natural or artificial cellulosic materials or cellulose ether materials, not deleteriously affected by the treatment.

What I claim and desire to secure by Letters Patent is:—

1. Process for reducing the ester content of materials having a basis of organic esters of cellulose, which comprises mechanically impregnating said materials with an aqueous medium containing a saponifying agent while said materials contain a sufficient quantity of a hygroscopic substance in amount equal to at least 10% based on the cellulose ester material whereby said materials are enabled to take up and retain the amount of saponifying agent required to reduce the ester content to the desired degree, the amount of saponification effected being at least 20% of the original ester content of the material.

2. Process for reducing the ester content of materials having a basis of organic esters of cellulose, which comprises mechanically impregnating the outer layers of said materials with an aqueous medium containing a saponifying agent while said materials contain sodium acetate in an amount equal to at least 10% based on the weight of the materials whereby said materials are enabled to take up and retain the amount of saponifying agent required to reduce the ester content to the desired degree, the amount of saponification effected being at least 20% of the original ester content of the material.

3. Process for reducing the ester content of materials, having a basis of cellulose acetate, which comprises mechanically impregnating the outer layers of said materials with an aqueous medium containing a saponifying agent while said materials contain sodium acetate in an amount equal to at least 10% based on the weight of the materials whereby said materials are enabled to take up and retain the amount of saponifying agent required to reduce the ester content to the desired degree, and immediately thereafter drying the materials under the influence of heat so as to effect a rapid saponification, the amount of saponification effected being at least 20% of the original ester content of the material.

4. Process for reducing the ester content of materials having a basis of organic esters of cellulose, which comprises mechanically impregnating the outer layers of said materials with an aqueous medium containing a saponifying agent while said materials contain a water-soluble cellulose ether in an amount equal to at least 10% based on the weight of the materials whereby said materials are enabled to take up and retain the amount of saponifying agent required to reduce the ester content to the desired degree, the amount of saponification effected being at least 20% of the original ester content of the material.

5. Process for reducing the ester content of materials having a basis of organic esters of cellulose, which comprises mechanically impregnating the outer layers of said materials with an aqueous medium containing a saponifying agent while said materials contain an aliphatic alcohol having at least 2 hydroxy groups in an amount equal to at least 10% based on the weight of the materials whereby said materials are enabled to take up and retain the amount of saponifying agent required to reduce the ester content to the desired degree, the amount of saponification effected being at least 20% of the original ester content of the material.

6. Process for reducing the ester content of materials having a basis of organic esters of cellulose, which comprises mechanically impregnating the outer layers of said materials with an aqueous medium containing a saponifying agent while said materials contain at least 10% of their weight of a hygroscopic substance whereby said materials are enabled to take up and retain the amount of saponifying agent required to reduce the ester content to the desired degree, and continuing saponification until at least 50% of the original ester content of said materials is removed.

7. Process for reducing the ester content of materials having a basis of organic esters of cellulose, which comprises mechanically impregnating the outer layers of said materials with an aqueous medium containing a saponifying agent while said materials contain at least 10% of their weight of a hygroscopic substance whereby said materials are enabled to take up and retain the amount of saponifying agent required to reduce the ester content to the desired degree, and continuing saponification until at least 75% of the original ester content of said materials is removed.

8. Process for reducing the ester content of artificial filaments, threads, yarns and similar materials which have a basis of organic esters of cellulose and which have been subjected to a stretching operation, and of fabrics and other products containing such materials, which comprises mechanically impregnating the outer layers of said materials with an aqueous medium containing a saponifying agent while said materials contain at least 10% of their weight of a hygroscopic substance whereby said materials are enabled to take up and retain the amount of saponifying agent required to reduce the ester content to the desired degree, the amount of saponification effected being at least 20% of the original ester content of the material.

9. Process for reducing the ester content of artificial filaments, threads, yarns and similar materials which have a basis of cellulose acetate which have a tenacity of at least 2.5 grams per denier, and of fabrics and other products containing such materials, which comprises mechanically impregnating the outer layers of said materials with an aqueous medium containing a saponifying agent while the materials contain at least 10% of their weight of a hygroscopic substance whereby said materials are enabled to take up and retain the amount of saponifying agent required to reduce the ester content to the desired degree, the amount of saponification effected being at least 20% of the original ester content of the material.

10. Process for reducing the ester content of artificial filaments, threads, yarns and similar materials which have a basis of cellulose acetate, which comprises mechanically impregnating the outer layers of said materials with an aqueous medium containing a saponifying agent while said materials contain at least 10% of their weight of a hygroscopic substance whereby the materials are enabled to take up the amount of saponifying agent required to reduce the ester content to the desired degree, the operations of mechanically impregnating and saponification being carried out on a number of said materials in a form of warp during the travel of said materials from one point to another, the amount of saponification effected being at least 20% of the original ester content of the material.

HENRY DREYFUS.